June 26, 1951 R. POLK, SR., ET AL 2,558,579
APPARATUS FOR SECTIONIZING CITRUS FRUIT
Filed Oct. 28, 1948 2 Sheets-Sheet 2

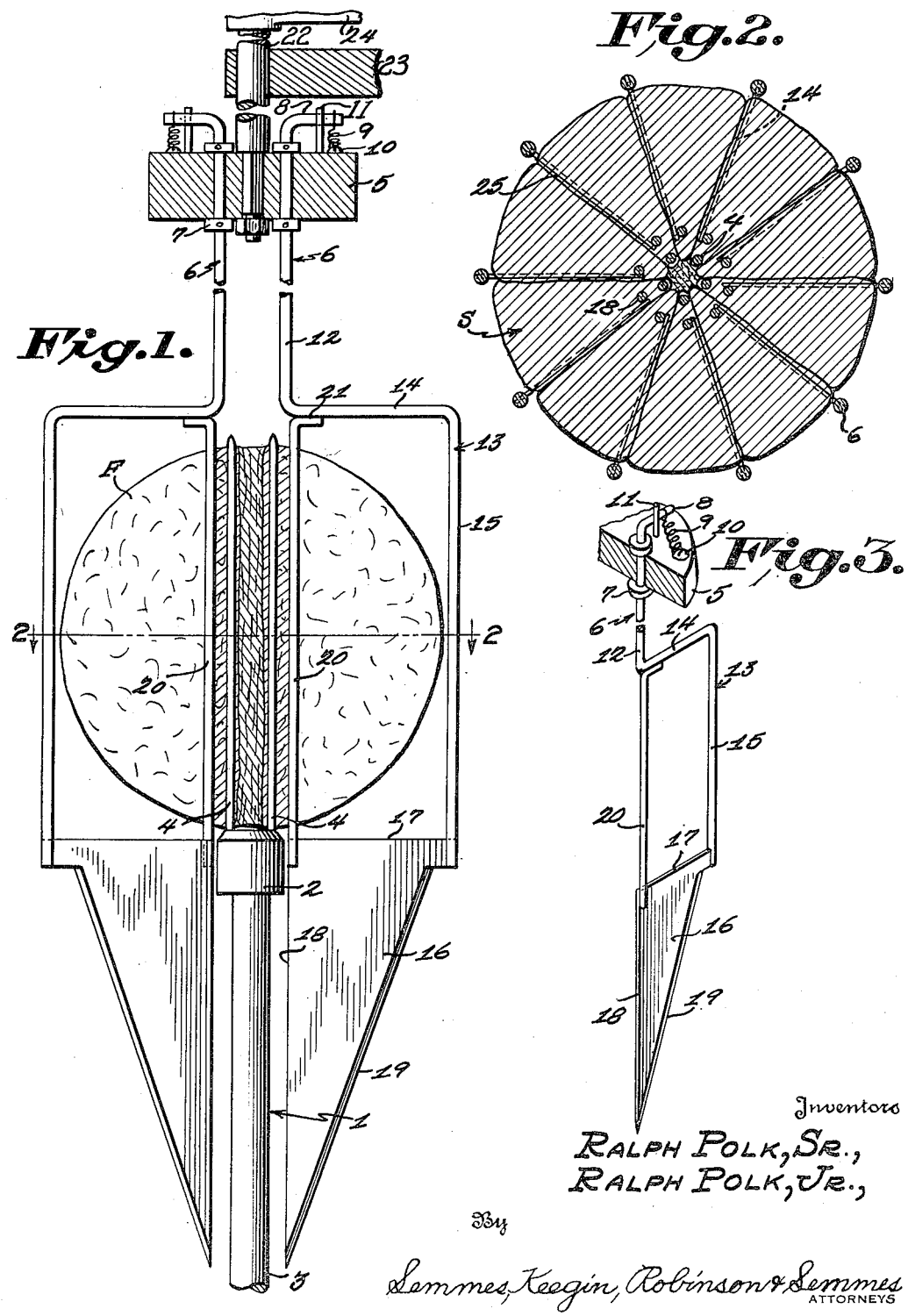

INVENTORS
RALPH POLK SR.
RALPH POLK JR.
BY
ATTORNEYS

Patented June 26, 1951

2,558,579

UNITED STATES PATENT OFFICE 2,558,579

APPARATUS FOR SECTIONIZING CITRUS FRUIT

Ralph Polk, Sr., and Ralph Polk, Jr., Tampa, Fla., assignors to The Polk Development Company, Tampa, Fla., a copartnership Application October 28, 1948, Serial No. 57,086

2 Claims. (Cl. 146—40)

This invention relates generally to the sectionizing of citrus fruit and more particularly to apparatus for separating the segmental juice sac bundles from the radial membrane walls of citrus fruit, such as grapefruit and oranges.

Citrus fruit is composed of a number of segmental bundles of juice sacs which surround and extend radially from a pithy core. Each juice sac bundle is surrounded by a membrane, commonly known as the section wall, and the sections are surrounded by the peel of the fruit. Sectionizing is dividing the fruit into its several membrane-free segmental juice sac bundles or meats, and is carried out by first completely removing the peel and the circumferential membrane from the sections, and then separating the segmental meats from their adjoined radial membrane walls either by hand or by machine. This last operation is usually performed by slitting along one radial wall of the sections and pulling or stripping the meats free from the other radial wall.

Various tools and mechanisms have been proposed for mechanically removing the segmental meats from their membrane walls, but those heretofore proposed have employed the separate operations for slitting the meat from one membrane wall and stripping it from the other wall, and have been performed by separate tools requiring moving the fruit from one station in the machine to another station for the different operations. The necessity for such movement not only retards the sectionizing process, but requires complicated, intermittent motion mechanism which adds not only to the initial cost of the machine, but also to its upkeep.

An object of this invention, therefore, is to provide apparatus for sectionizing citrus fruit in which the segmental meats may be completely separated from their radial membrane walls by means of a composite tool at a single station of a sectionizing machine.

Another object of the invention is to provide a composite tool as specified above which co-operates with the holding fork, supporting a whole peeled fruit, by an axial and rotary movement relatively thereto to slit the segmental meats from one radial membrane wall of the sections and then strip the meats from the other radial wall.

A further object of the invention is to provide apparatus of the above character which is simple and economical to construct and maintain and is efficient in operation.

With the above and other important objects and advantages in view, the invention consists in the parts and combinations hereinafter set forth with the understanding that various changes may be made therein by those skilled in the art, such as in the shape, size, and arrangement of parts, or by the substitution of equivalents, without departing from the invention or exceeding the scope of the appended claims.

In order to make the invention more clearly understood, a preferred embodiment thereof has been made the subject of illustration in the accompanying drawings in which:

Figure 1 is a longitudinal sectional view, partly in elevation, of the preferred embodiment of sectionizing apparatus according to the invention;

Figure 2 is a cross sectional view taken along the line 2—2 of Figure 1 looking in the direction of the arrows; and Figure 3 is a view in perspective of one of the composite slitting and stripping tools forming a part of the apparatus shown in Figure 1.

Figure 4:
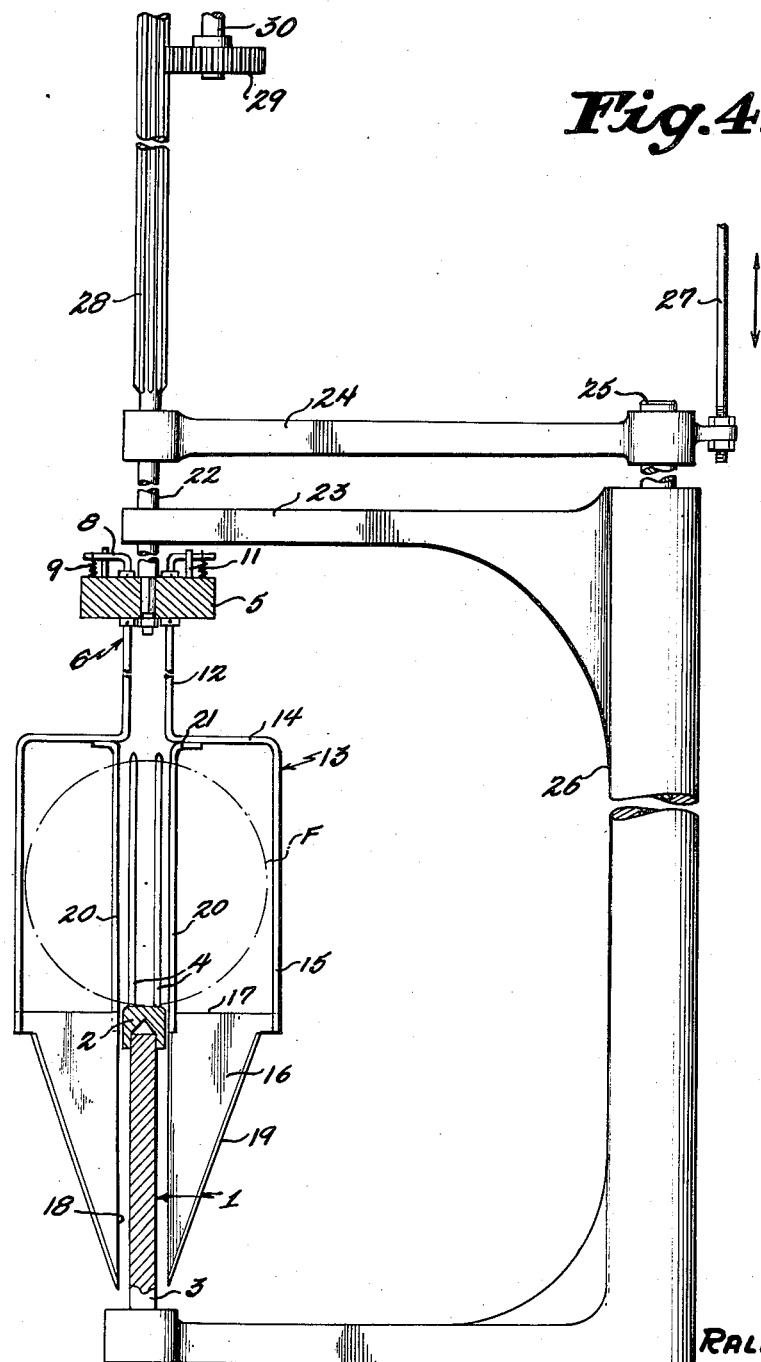
Figure 4 is an elevational view of the sectionizing apparatus of this invention, similar to Figure 1, but illustrating a typical structure for driving the sectionizing mechanism.

As seen in Figure 1, there is provided a holding fork 1, of more or less conventional design, which comprises a circular head 2 coaxially carried on the end of a stationary supporting rod 3. Fixed in the head 2 and extending upwardly therefrom is a circular series of parallel tines 4 coaxial with the rod 1 and arranged in a circle of a diameter such as to penetrate a fruit polarwise through the apex regions of a corresponding number of fruit sections, as clearly shown in Figure 2.

Coaxially aligned with the series of tines 4 is a tool supporting head 5, which conveniently may be a circular disc, and in which is journalled a circular series of brackets 6. These brackets conveniently may be made of round rod and extend through the head 5, and are held therein against relative axial movement, such as by collars 7 secured to the rods and abutting the opposite faces of the head 5.

The ends of the brackets 6 extending above the head 5 are bent at right angles as indicated at 8, and have a tensioning spring 9 secured adjacent each end, the other end of each spring is anchored to the head, such as shown at 10. The springs 9 are arranged to urge all of the brackets 6 in the same rotary direction, and such rotation is limited to a normal position of the brackets by means of pins 11 secured in the head 5 to engage the right angular extensions 8.

Below the head 5, each of the brackets 6 extends straight downwardly, forming a shank 12 which terminates in an inverted L-shaped offset 13 extending radially outwardly from the axis of the series of brackets in their normal position. These offsets are formed by bending the shank 12 outwardly at right angles thereto as indicated at 13, and then downwardly parallel to the shank 12 as indicated at 15. The offsets 13 are sufficiently offset from the axis of the series of brackets so that the down-bent portions 15 will encompass the fruit when telescoped thereover as indicated in Figure 1 and as will be described. The down-bent portions 15 are of a length somewhat in excess of the diameter of the fruit while the straight shank portions 12 have a length sufficient to give some flexibility thereto.

Each of the brackets 6 supports a relatively thin, flat cutting blade 16 in the form of a right angled scalene triangle positioned with the short side 17 uppermost and the side 18 forming the right angle with the side 17 parallel with the axis of the holding tines 4. The hypotenuse of the triangle is preferably somewhat sharpened to form a cutting edge 19. The blades are secured to the brackets such as by welding the extremity of the down-bent portion 15 of the bracket to the blade adjacent the angle between the sides 17 and 19 and with the plane of the blade coinciding with that passing through the offset 13.

Secured to each of the blades 16 adjacent the angle formed by the sides 17 and 18 is a rod 20 of relatively small diameter which extends upwardly from the blade forming a substantially straight line continuation of the side 18. The upper end of each rod 20 is secured, such as by welding, to the radially offset portion 14 of its corresponding bracket, as indicated at 21.

The head 5 is supported for axial and rotary movement relatively to the holding fork 1, such as by means of a shaft 22 rigidly secured centrally in the head 5 and coaxially aligned with the common axis of the series of tines 4 and brackets 6. The shaft 22 is journalled for axial and rotary movement such as in a stationary bearing 23, and is fitted with suitable means such as an arm 24 for imparting the above mentioned axial movement thereto. For the required axial movement, arm 24 may be secured to a shaft 25 slidable vertically in a standard 26. The arm 24 is also connected to a connecting rod 27 which may be driven by any conventional apparatus, such as a cam, for imparting reciprocating motion to the connecting rod 27 and hence arm 24. In order to rotate the head 5, shaft 22 is provided with an elongated splined section 28 which engages a pinion gear 29 driven by a shraft 30 connected with any suitable means for imparting rotational motion.

In the inoperative position of the sectionizing tool above described, the head 5 is elevated above the holding fork with the blades 16 spaced above the upper extremities of the tines 4. In operation a fruit, as indicated at F, is peeled and the outer membrane wall removed in the usual manner, such as by immersing in a hot alkali solution. The fruit is then impaled polarwise on the tines 4 of the holding fork with the tines passing through the apex regions of the fruit sections S, as indicated in the drawings. Preferably the tines 4 are of such length as to pass through or substantially through the fruit.

The head 5 is now lowered by axial movement of the shaft 22, and the blades 16 are passed completely through the fruit sections lying in their paths. Because of the slight flexibility of the brackets 6 and their permissible relative rotary movement, the blades 16 will automatically find paths which lie closely adjacent one radial membrane wall of the sections and in their passage through the section will slit the meat from this wall, as indicated at 25 in Figure 2. At the extreme downward position of the head 5 the blades 16 will have passed completely through the fruit, as indicated in Figure 1, while the rods 20 will lie within the fruit sections in a circular series surrounding the series of tines 4. The head 5 is now given a rotary movement relatively to the holding fork 1 which movement is also imparted to the rods 20 with the result that the rods 20 engage the radial walls of the sections and wrap the walls against radially outward displacement, held by the tines 4, spirally around the series of tines and thereby pull or strip the membrane from the meat of the sections, allowing the substantially whole meats to fall free.

The rods forming the bracket 6 are preferably of a diameter to give a substantial amount of rigidity to the brackets. The rods 20, however, are of a relatively small diameter to prevent appreciable compression and crushing of the juice cells during the stripping operation above described. While preferably one of the slitting and stripping tools should be provided for each fruit section, the number of sections of a fruit vary, and satisfactory operation has been accomplished with apparatus in which there are less tools than fruit sections, since if most of the sections are slit by the knives, the few remaining unslit meats will be stripped from both membrane walls by the drawing action as the walls are wrapped spirally around the series of tines.

While the operation has been described by moving the knives and stripping rods relatively to a stationary holding fork, it is obvious that the same result could be accomplished by moving the holding fork relatively to stationary knives and stripping rods.

From the foregoing it will be seen that we have provided a composite tool for performing two sectionizing operations at a single location in a sectionizing machine to thereby reduce the cost of the machine and to effect a saving in time in the sectionizing process.

We claim:

1. In apparatus for sectionizing citrus fruit including a holding fork having a circular series of parallel tines adapted to penetrate a peeled fruit polarwise within the apices of section walls thereof, a circular series of composite sectionizing tools in coaxial alignment with said series of tines, each tool comprising a relatively thin flat blade of a width in excess of the radial dimension of a fruit section and having a straight longitudinal edge parallel with the series of tines and arranged in a circle of slightly larger diameter than said series and with the planes of the blades extending generally radially from the axis of the series and each blade having a rod member of relatively small diameter connected respectively therewith and forming a substantially straight line continuation of said edge, each rod having a length extending from the blade in excess of the fruit diameter, a tool supporting head positioned above said tines, a circular series of brackets, each bracket composed of a shank portion connected with the head and a radially offset portion of inverted L-shape connected with the upper end of the blade and rod member of each tool respectively, the said shank portion being substantially in axial alignment with said rod member and the extremity of the offset connected adjacent the outer edge of the blade, and means for moving relatively the head and holding fork first axially to pass the blades completely through a corresponding number of sections of a fruit held on the fork to slit the meat of the sections from one radial wall thereof and position said rod members in the slits and then rotationally to engage the rod members with the radial walls to wrap the radial walls spirally about the series of tines to strip the meats from the remaining radial walls.

2. Apparatus according to claim 1 in which each of the blades is in the shape of a right angled scalene triangle with the longer side forming the right angle parallel with the tines and the short side lying facing the head and of a length in excess of the radial dimension of a fruit section.

RALPH POLK, Sr.
RALPH POLK, Jr.

REFERENCES CITED

The following references are of record in the file of this patent:

UNITED STATES PATENTS

| Number | Name | Date |
|---|---|---|
| 2,199,345 | Polk, Sr. et al. | Apr. 30, 1940 |
| 2,240,909 | Polk, Sr. et al. | May 6, 1941 |
| 2,240,910 | Polk, Sr. et al. | May 6, 1941 |
| 2,247,589 | Polk, Sr. et al. | July 1, 1941 |